(12) United States Patent
Hironaka

(10) Patent No.: US 6,240,624 B1
(45) Date of Patent: Jun. 5, 2001

(54) METHOD FOR MANUFACTURING HEATING ELEMENT HAVING COATING LAYER OF CATALYST AND ELECTRONIC DUST COLLECTOR USING SAID HEATING ELEMENT AND AIR CONDITIONER PROVIDED THEREWITH

(75) Inventor: Yasumasa Hironaka, Nara (JP)

(73) Assignee: Funai Electric Co., Ltd. (JP)

( * ) Notice: Subject to any disclaimer, the term of this patent is extended or adjusted under 35 U.S.C. 154(b) by 0 days.

(21) Appl. No.: 09/419,981

(22) Filed: Oct. 18, 1999

Related U.S. Application Data

(62) Division of application No. 09/200,524, filed on Nov. 25, 1998, now Pat. No. 6,034,354.

(30) Foreign Application Priority Data

Nov. 26, 1997 (JP) .................................. 9-324809

(51) Int. Cl.[7] .................................. H05B 3/00
(52) U.S. Cl. .................................. 29/611
(58) Field of Search .................. 29/610.1, 611, 29/613, 614; 388/238–243, 247, 273, 274; 219/342, 353, 539, 544, 383

(56) References Cited

U.S. PATENT DOCUMENTS

| 3,330,034 | * | 7/1967 | Price | 29/611 |
|---|---|---|---|---|
| 3,812,580 | * | 5/1974 | Drugmand | 29/611 |
| 4,034,330 | * | 7/1977 | Goto | 338/238 |
| 4,326,122 | * | 4/1982 | McCulloch | 219/544 |
| 4,551,619 | * | 11/1985 | Lefebvre | 219/523 |
| 5,134,772 | * | 8/1992 | McQueen | 29/611 |

FOREIGN PATENT DOCUMENTS

| 0013034 | * | 1/1979 | (JP) | 29/611 |
|---|---|---|---|---|
| 8-41655 | | 2/1996 | (JP) . | |
| 9-61042 | | 3/1997 | (JP) . | |

* cited by examiner

Primary Examiner—Gregory L. Huson
Assistant Examiner—Sean Smith
(74) Attorney, Agent, or Firm—Morrison Law Firm

(57) ABSTRACT

A dust collection electrode with catalyst to be provided on the electronic dust collector is manufactured simply at low cost without using a furnace. To the surface of the metal tube of the sheathed heater a low temperature curing type heat resistant inorganic adhesive is applied. Thereafter, a catalyst such as Zeolite is adhered to the heat-resistant inorganic adhesive. Next, the sheathed heater is energized to make self-heating, and using said heating, the heat-resistant inorganic adhesive is heated to cure, thereby fixing the layer to the surface of the metal tube.

8 Claims, 6 Drawing Sheets

METHOD FOR MANUFACTURING HEATING ELEMENT HAVING COATING LAYER OF CATALYST AND ELECTRONIC DUST COLLECTOR USING SAID HEATING ELEMENT AND AIR CONDITIONER PROVIDED THEREWITH

This application is a division of application Ser. No. 09/200,524, filed Nov. 25, 1998, U.S. Pat. No. 6,034,354.

BACKGROUND OF THE INVENTION

1. Field of the Invention

The present invention relates to a method for manufacturing a heating element having a coating layer of catalyst or the like, and electronic dust collector using said heating element, and an air conditioner provided therewith. Especially, the invention relates to a technique for forming a ceramic catalyst layer on a sheathed heater simply and at low cost.

2. Description of the Prior Art

Hitherto, there has been known, as an example of a heating element provided with a coating layer such as a catalyst, as shown for example in Japanese Laid-open Patent Publication No. HEI 9-61042, one made by coating a surface of a glass tube heater (sheathed heater) self-containing an electric resistor with a catalyst coating layer. Further, there is known, as shown for example in Japanese Laid-open Patent Publication No. HEI 8-41655, one made by providing an aluminized steel, coating the surface thereof with a glass coating, firing, and further forming a catalyst coating layer on its surface.

By the way, the coating of a catalyst or the like in the heating element is formed through a baking treatment in a high temperature furnace. The sheathed heater as a heater material is made by filing an electric resistor line, magnesium oxide, etc. in a metal tube, and sealing both ends of the metal tube. Accordingly, the glass sealed port parts require to be immune from thermal destruction. Thus, according to the conventional method of manufacturing the heating element for forming a catalyst coated layer on the metal tube surface of the sheathed heater, there has been practiced, prior to sealing with glass the metal tube of the sheathed heater, to provide the metal tube surface with a catalyst or the like by baking, followed by inserting a filler in the metal tube and then providing glass sealing. Also, in the one made by using a metal tube of a piece independent from the metal tube of the sheathed heater, a metal tube of a separate piece is put in a furnace, a catalyst coated layer is fired on the tube surface, and a metal tube provided with firing of the catalyst layer is fixed to the metal tube of the sheathed heater by caulking.

However, in case of the method for manufacturing the heating element with a catalyst layer as described above, a baking treatment using a high temperature furnace is required for forming a catalyst layer, for which purpose a large scale equipment is required, and there is a problem of difficulty to manufacture a heating element simply at a low cost. Furthermore, in the method of forming a catalyst layer directly on the surface of the metal tube of the sheathed heater, the completed sheathed heater cannot be used, because of which the manufacturing steps are increased, leading to a cost increase.

SUMMARY OF THE INVENTION

The present invention has been made to dissolve the problems mentioned above, and its object is to manufacture a heating element in which the baking treatment using a furnace is unnecessary; breakage of the glass seals of the heater material by the high temperature seizure in furnace can be evaded; to form a coating layer such as a catalyst direct on the heater material easily at a low cost. Furthermore, the object is to provide an electronic dust collector using the heating element manufactured under the method for manufacturing the heating element and an air conditioner equipped with said electronic dust collector.

In order to attain the above object, the present invention provides a method for manufacturing a heating element made by forming a coating layer of catalyst or the like on the surface of a heater element, comprising: a step of coating the surface of a heater material with a low temperature curing type heat resistant inorganic adhesive; a step of depositing a substance forming a coating layer such as a catalyst on the heat resistant inorganic adhesive; and a step of energizing said heater material to self-generate heat, heating to cure said heat resistant inorganic adhesive with said heating, thereby fixing the coating layer of catalyst or the like on the heater material.

In this manufacturing method, the heater material is energized under the condition where a coating layer such as a catalyst is adhered to the heat resistant inorganic adhesive applied to the surface of the heater material, and by the self-exothermic heat the low temperature curing type heat resistant inorganic adhesive is cured under heat, thereby fixing the catalyst layer onto the heater material by baking. Since the catalyst layer is baked to fix to the heater material, a high temperature baking in furnace becomes unnecessary, the equipment can be simplified, and manufacturing at low cost is possible.

As a heater material, there can be used a sheathed heater made by inserting an electric heating line in a metal tube and sealing with glass both ends of said metal tube. In the present invention method, because the baking in furnace is unnecessary, it becomes possible to form a catalyst layer in a simple manner on a metal tube of a sheathed heater without causing damage to the glass sealed port of the sheathed heater.

It is desirable for the above coating layer with a catalyst or the like to be at least one containing zeolite.

The present invention is also characterized by using a heating element as a dust collection electrode for collecting dust contained in air by using a discharge effect.

Also, the present invention covers an air conditioner characterized by arraying an electronic dust collector in an air passage in the conditioner.

BRIEF DESCRIPTION OF THE DRAWINGS

Hereinafter, with respect to the manufacturing method for the heating element having a coating layer of catalyst or the like formed according to an embodiment of the present invention, description is made taking an example of the method for manufacturing a dust collection electrode with catalyst.

DETAILED DESCRIPTION OF THE PREFERRED EMBODIMENT OF THE PRESENT INVENTION

Figure 1A:
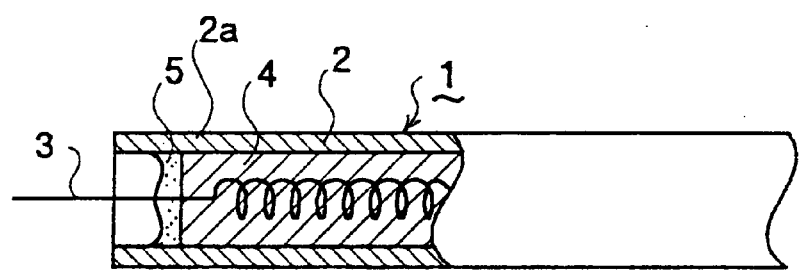
FIGS. 1(a) to (c) are sectional view of the essential part of a dust collection electrode with catalyst for illustrating the method for manufacturing a heating element having a coating layer of catalyst or the like according to an embodiment of the present invention.
Figure 1B:
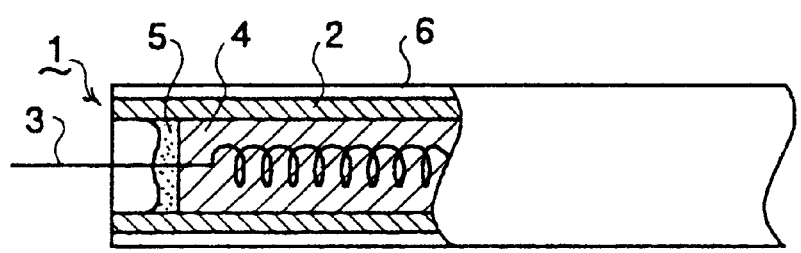
Figure 1C:
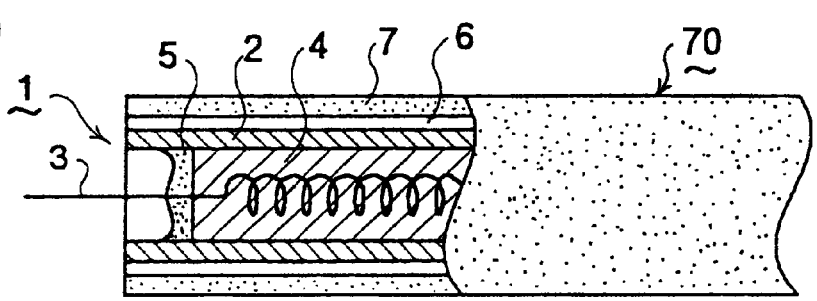
Figure 2:
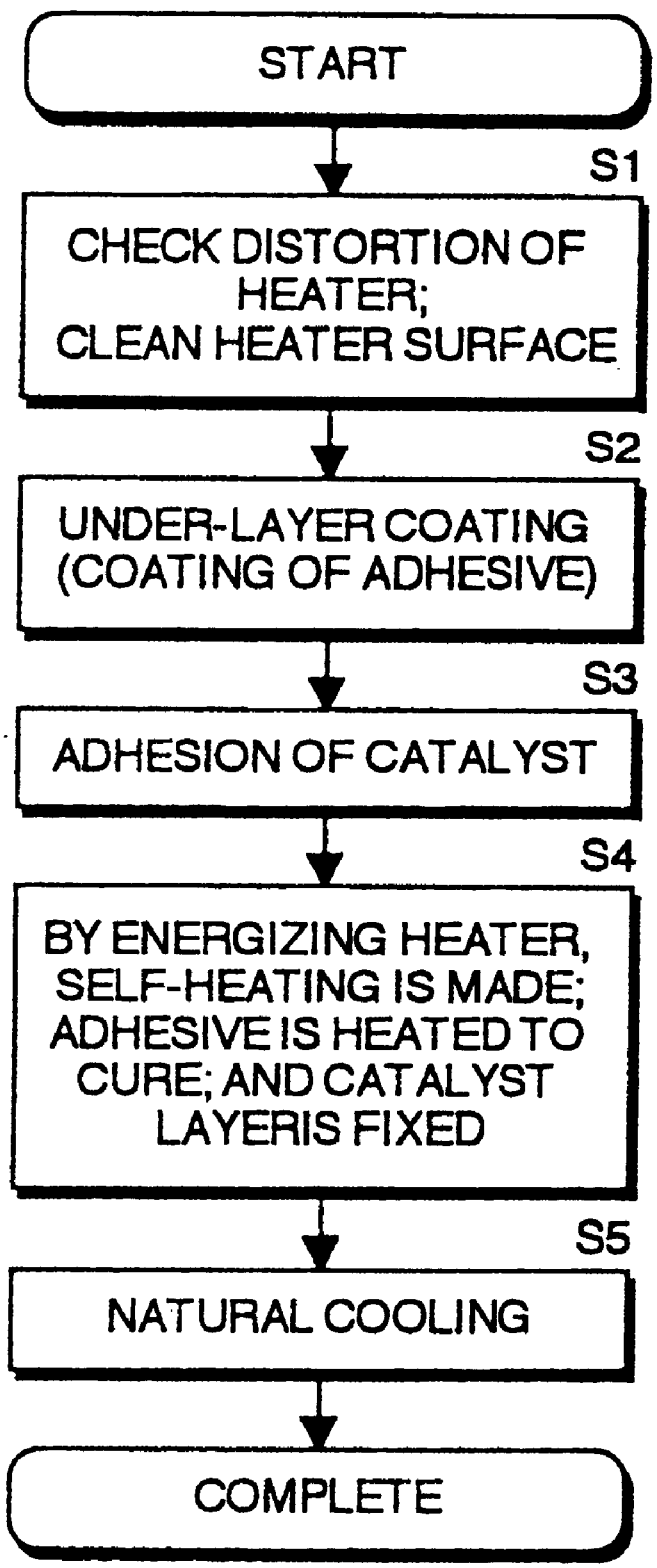
FIG. 2 is a flow chart for illustrating the method for manufacturing a heating element having a coating layer of catalyst or the like formed thereon.
Figure 3:
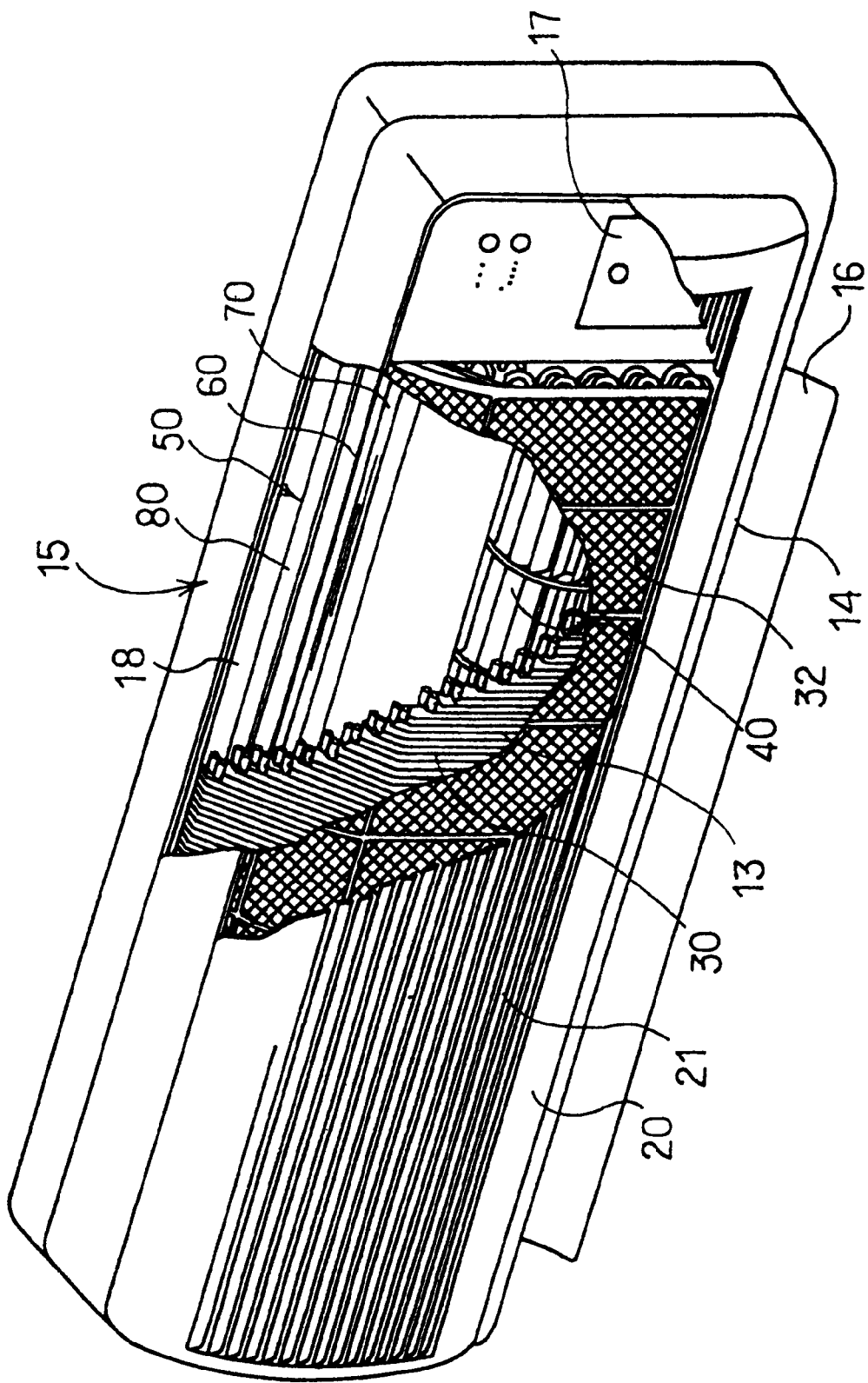
FIG. 3 is a partially broken perspective view of an air conditioner with electronic dust collector according to an embodiment of the present invention.
Figure 4:
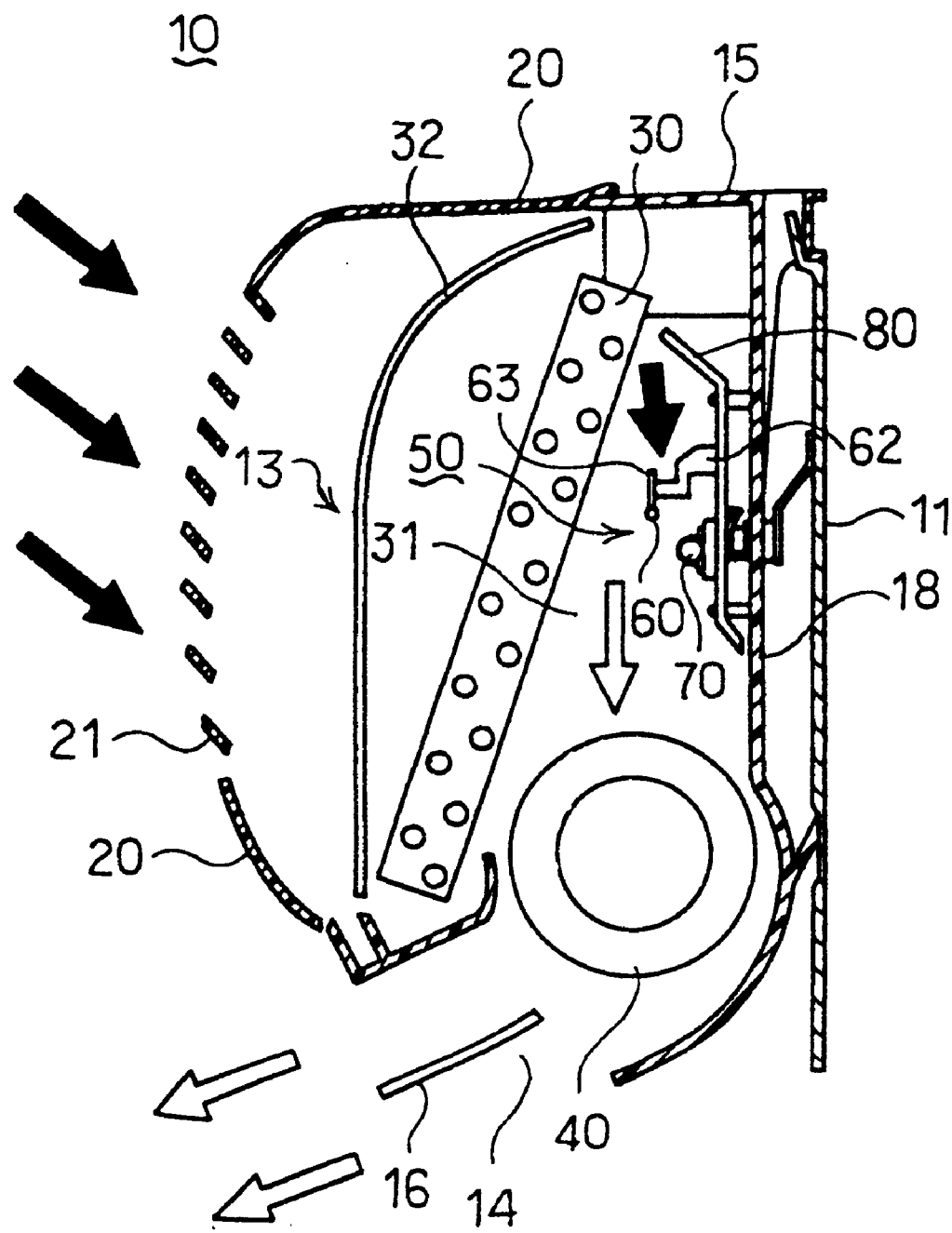
FIG. 4 is a side view of an air conditioner with electronic dust collector showing the flow of air during air conditioning.
Figure 5:
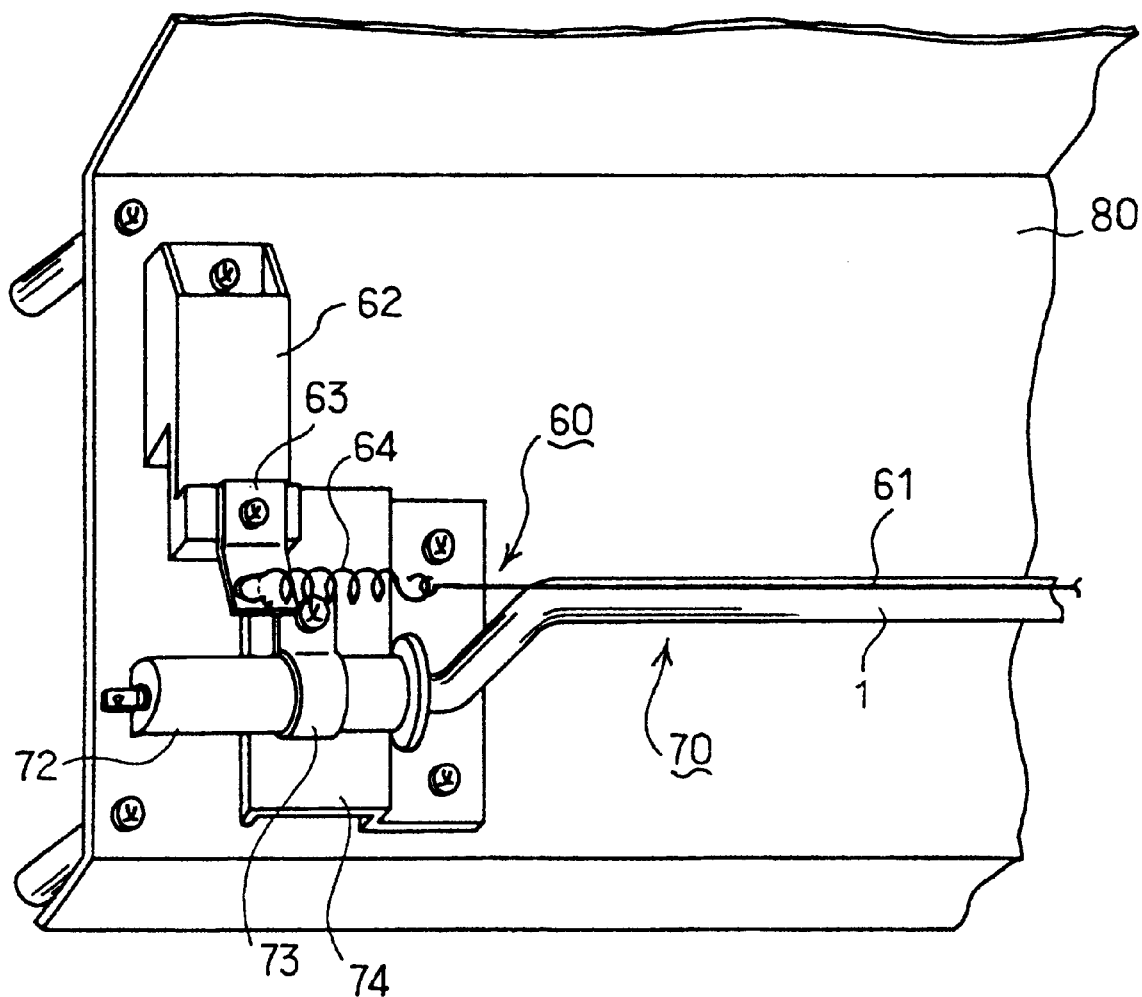
FIG. 5 is a partial perspective view of an electronic dust collector.
Figure 6:
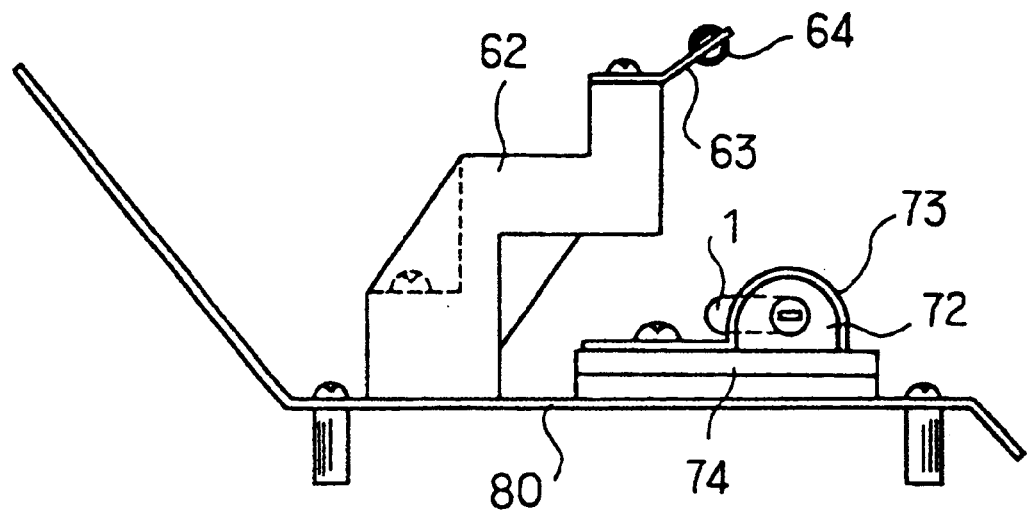
FIG. 6 is a partial side view of an electronic dust collector.
Figure 7:
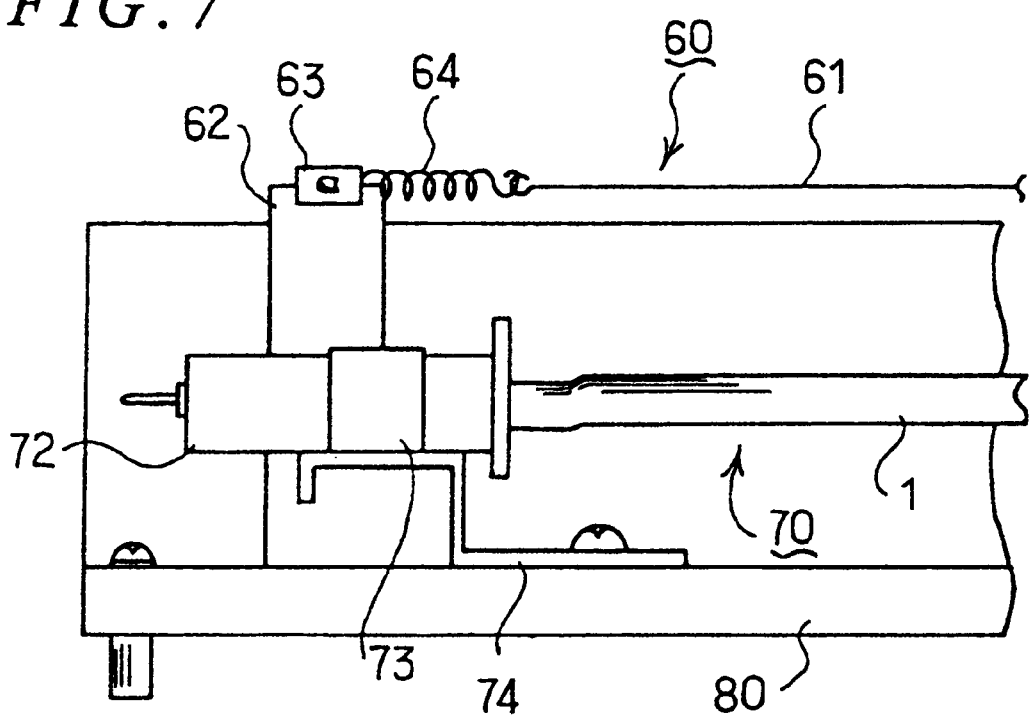
FIG. 7 is a partial bottom view of an electronic dust collector.

Referring to FIG. 1 and FIG. 2, the dust collection electrode with catalyst is used in a couple with the discharge electrode and is equipped in the electronic dust collector. The electronic dust collector is to collect dust and fine particles contained in air by using the discharge effect, and it is furnished with a self-cleaning function to remove the dust deposited on the dust collection electrode by decomposition by oxidation during self-cleaning. Details of the constitution of the electronic dust collector will be described in detail later.

In manufacturing a dust collection electrode, at first the sheathed heater 1 (heater material) is checked to confirm if it has any distortion, and soiling on the surface of the heater 1 is wiped off with a rug impregnated with ethanol (FIG. 2 S1). This sheathed heater 1 comprises, as shown in FIG. 1(a), an aluminum metal tube 2, and an electric resistance line (nickel-chrome wire) 3. The metal tube 2 is filled with magnesium oxide 4 to prevent a metal tube 2 from coming into contact with an electric resistance line 3. The end 2a of the metal tube 2 is sealed by a glass sealing material 5. This sheathed heater 1 has small energy per unit area in the order of 100V 180 W(Watt).

To the surface of the metal tube 2 of the sheathed heater 1 a low temperature curing type starch-like heat resistant inorganic adhesive 6 is applied as an under-layer coating [S2, FIG. 1(b)], and the coating is allowed to stand until the surface is dried. Thereafter, a heat resistant inorganic adhesive 6 is further applied, and before it is dried, a sheathed heater 1 is placed on the catalyst 7, and the catalyst 7 is adhered to the heat-resistant inorganic adhesive 6 in a pressing manner [S3, FIG. 1(c)]. Under this condition, the processed object is allowed to stand at room temperature for more than 2 hours to cure naturally. The catalyst 7 contains catalytic substances such as represented by zeolite, active alumina, manganese dioxide, etc. Zeolite (generally called Zeolite) has a hollowed three dimensional mesh structure, which accelerates the reaction of the molecules adsorbed in the hollow space. The active alumina ($Al_2O_3$) is alumina powder having high adsorption capacity it has small crystal particle size, large surface area, and is suitable as a catalyst, catalyst carrier, and adsorbing agent. Manganese dioxide ($MnO_2$) has a function as a catalyst in the same manner as in zeolite and active alumina as stated above.

Next, in order to cure the heat-resistant inorganic adhesive 6, the electric resistance line 3 is energized while varying the voltage with SLIDACK to cause the heater 1 to self-generate heat (S4). This energizing control with SLIDACK is made such that at first a voltage of 28V is applied for about 1 hour and a half to bring the surface of the heater 1 to about 90° C., next, a voltage of 44V is applied for about 1 hour to make the heater surface about 150° C., and finally, a voltage of 100V is applied for about 10 minutes. By this step, it is possible to provide the heat-resistant inorganic adhesive 6 and catalyst 7 with heating and dehydrating treatment and heating and curing treatment, to fix the catalyst 7 to the heater 1, and to form a catalyst layer. Next, energizing control to the heater 1 is discontinued to allow the heater to cool naturally (S5) and a dust collection electrode 70 with catalyst as shown in FIG. 1(c) is completed.

As described above, by heating the low temperature curing type heat-resistant inorganic adhesive 6 at a low temperature (about 150° C.) by application of electricity to the sheathed heater 1 and allowing to cure, the catalyst 7 is to be fixed to the surfer of the sheathed heater 1. Accordingly, without using a furnace, a dust collection electrode 70 with catalyst can be manufactured without damaging the glass sealing member 5 of the sheathed heater 1. Further, as no furnace is used, the dust collection electrode 70 can be made simply at low cost.

Next, an electronic dust collector provided with a dust collection electrode with catalyst manufactured by the manufacturing method as described above is explained on the case of the application to an air conditioner with reference to the drawing.

Referring to FIG. 3 through FIG. 7, an air conditioner with dust collector 10 has both the air conditioning function for cooling or heating air in room and the dust collection function for removing dust contained in interior air to clean air, and is to be fixed to wall or the like through a fixing plate 11. The air conditioner 10 has a casing 15 which opens at its front face as an air suction port 13 and provided with an air blow port 14 beneath it, a front panel 20 having a front grill 21 and to be fitted to the air suction port 13 of the casing 15, a heat exchanger 30 provided in the casing 15 facing the suction port 13 of the casing 15, a cross-flow type fan 40 provided on the depth side of the blow port 14 so as to circulate air from the suction port 13 to the blow port 14 through the heat exchanger 30, and an electronic dust collector 50 disposed on the air path 31 on the rear face side of the heat exchanger 30. A filter 32 is provided between the front panel 20 and the heat exchanger 30. An angle adjusting type looper 16 is provided at the blow port 14 of the casing 15. In the casing 15 there is provided a control circuit 17 (control means) for controlling the whole of the air conditioner 1. The heat exchanger 30 is connected by a heat exchanger of an external unit (not illustrated) and a coolant pipe.

The electronic dust collector 50 is constituted by a horizontally stretched linear discharge electrode 60, a bar-like dust collection electrode 70 which is provided at a predetermined distance from the discharge electrode 60 and which contains a sheathed heater 1 for self-cleaning, and a heat shielding plate 80 for holding the discharge electrode 60 and the dust collection electrode 70. The discharge electrode 60 and the dust collection electrode 70 are fixed to the surface of the vertical back plate part 18 of the casing 15 so as to face the discharge electrode 60 and the dust collection electrode 70 on the inside of the air passage 31.

The discharge line 61 which constitutes a discharge electrode 60 is held through a tensile spring 64 to the electrode 63 which is fixed at both ends to the holding member 62, and fixed at a set position by the tension of the tensile spring 64. To the discharge line 61 a voltage is applied from the electrode 63 through the tensile spring 64. The dust collection electrode 70, being manufactured by the manufacturing method shown in the above FIG. 1 and FIG. 2, is disposed on the downstream side of the air path 31 to the discharge electrode 60 at a predetermined distance, and the lengthwise end parts 72 of the dust collection electrode 70 are fixed to the holding members 74 by the stopper members 73. To the discharge electrode 60 and the dust collection electrode 70 the positive DC voltage and the negative DC voltage are to be applied, respectively at the time of the air purification motion. The holding member 62 and the holding member 74 are fixed to the heat shielding plate 80.

Next, the operation of the air conditioner 10 with dust collector constituted as above is described. During the air conditioning, by operating the heat exchanger 30 and the fan 40, air in the room passes through the front grill 21 of the front panel 20 and the filter 32 and is introduced in the casing 15, and after being cooled or heated in the course of the passage through the heat exchanger 30, it flows through the air passage 31 of the back side vertically down from above. The air which passes through the air passage 31 passes the peripheral part of the dust collector 50. Here, a high voltage is applied to the position between the discharge electrode 60 and the dust collection electrode 70 of the dust collector 50 to generate corona discharge between the two electrodes 60 and 70. As a result, dust such as fine particles of tar (oil smoke) of tobacco present in the surrounding air of the discharge electrode 60 or cotton dust has deposition of positive ion formed by corona, and the fine particles and dust are positively charged. As a result, they are attracted by the Coulomb force between the two electrodes toward the dust collection electrode 70 and caught by the dust collection electrode 70 to effect electric dust collection. In case the fine particles of odorous components are contained in air, the odorous components are adsorbed by the catalyst layer 77 of the dust collection electrode 70 and deodorized. Thus, the air which passed through the heat exchanger 30 is purified in the course of passing through the air passage 31 on the back side thereof and discharged into the room through the air blow port 14.

Also, because the dust collection electrode 70 is disposed by displacing to the lee side of the discharge electrode 60, by the wind force of air flowing through the air passage 31 and Coulomb force sustained by dust from the dust collection electrode 70, the dust is to be directed toward the dust collection electrode 70. By this step, it becomes possible to have a larger amount of dust deposited on the dust collection electrode 70 to improve the dust collection effect by the dust collector 50.

In the control circuit 17, the duty of the current or voltage to be applied to the electric resistance line 3 [FIG. 1(c)] of the sheathed heater 1 may be changed to control the exothermic amount of the sheathed heater 1. As there is used as a sheathed heater 1 one having about 180 W of small energy per unit area, even if the energizing control with the control circuit 17 becomes the duty 100%, the ultimate temperature of the sheathed heater can be controlled to a level not exceeding 350° C. Furthermore, by suppressing to a temperature lower than 400° C. which is the lower limit of the firing temperature of the substance contained in surroundings, even if the plastic member constituting the casing 15 or the like comes into contact with the dust collection electrode 70, firing of plastics can be prevented.

Without being limited to the foregoing embodiment, various modifications are feasible in the present invention. Although, in the above embodiment, a method of manufacturing a heating element on which a coating layer such as a catalyst is formed has been shown taking a case of applying to the method for manufacturing a dust collection electrode with catalyst of the electronic dust collector, the said coating layer is not limited to the catalyst. For example, the ceramics that can be far infrared radiator may be used as a coating layer. Even in such a case, by using a low temperature curing type heat resistant inorganic adhesive and utilizing self-generation of heat by energizing the heater, a ceramic coating layer can be formed without using a furnace. Thus, it becomes possible to manufacture a heating element to radiate the far infrared ray simply at low cost.

It is also allowable to adopt a luminous element which shows change in color by temperature. By such a step, the heating element becomes a luminous element which generates various colors according to the energizing control to the sheathed heater. Moreover, a metal such as titanium oxide may be used as a coating layer. Since titanium oxide radiates ultraviolet ray under heat, the heating element becomes suitable as a device for preventing generation of mold on the cooler in a vehicle.

What is claimed is:

1. A method for manufacturing a heating element comprising:

a step of coating the surface of a heater material with a low temperature heat resistant inorganic adhesive;

a step of depositing a substance forming a coating layer on the heat resistant inorganic adhesive; and a step of energizing said heater material to self-generate heat, heating to cure said heat resistant inorganic adhesive with said heating, thereby fixing said coating layer on the heater material.

2. A method for manufacturing a heating element according to claim 1, further comprising a step of inserting an electric heating wire in a metal tube and sealing both ends of said metal tube with glass to form a sheathed heater as said heater material.

3. The method for manufacturing a heating element according to claim 1, wherein said coating layer includes at least zeolite.

4. The method for manufacturing a heating element according to claim 2, wherein said coating layer includes at least zeolite.

5. A method for manufacturing a heating element according to claim 1, wherein said coating layer includes at least one catalytic substance.

6. A method for manufacturing a heating element according to claim 5, where said at least one catalytic substance includes at least one of zeolite, active alumina, and manganese dioxide.

7. A method for manufacturing a heating element according to claim 2, wherein said coating layer includes at least one catalytic substance.

8. A method for manufacturing a heating element according to claim 7, where said at least one catalytic substance includes at least one of zeolite, active alumina, and manganese dioxide.

* * * * *